UNITED STATES PATENT OFFICE.

ISAAC L. JACKSON, OF WASHINGTON, DISTRICT OF COLUMBIA.

IMPROVEMENT IN COMPOSITIONS FOR PRINTERS' INKING-ROLLERS.

Specification forming part of Letters Patent No. 148,829, dated March 24, 1874; application filed February 5, 1874.

*To all whom it may concern:*

Be it known that I, ISAAC L. JACKSON, of Washington, District of Columbia, have made a new and useful Improvement in Composition for Printers' Rollers; and I do hereby declare that the following description is sufficiently full, clear, and exact to enable any person skilled in the art to which it appertains to make and use the same.

The invention relates to the composition of printers' rollers which shall be durable, elastic, and capable of remelting and recasting, and which shall not be too much affected by moisture or change of temperature in the atmosphere.

My roller composition is composed of the following ingredients, in about the proportions given: Glue, sixteen pounds; glycerine, sixteen pounds; borax, one pound; japan, one pound.

These proportions are adapted for use in a moist climate. For a dry climate the proportions of borax and japan may be reduced one-half. For a composition to be used in cold weather I increase the proportion of glycerine, and in hot weather reduce it, the other proportions remaining the same.

By the use of this composition I am enabled to produce printers' rollers with a smooth and even surface, not liable to become sticky or lose their elasticity by change of temperature, and which can be remelted and recast indefinitely.

The use of japan as a drier in my composition tends to hold the other ingredients in combination, and dries the glycerine to a proper consistency without excessive shrinkage.

The borax and japan I pulverize and add to the mixture as soon as the glue is melted.

Having thus described my invention, what I claim as new, and desire to secure by Letters Patent, is—

A composition for printers' inking-rollers, consisting of glue, glycerine, borax, and japan, in the proportions substantially as herein set forth.

ISAAC L. JACKSON.

Witnesses:
    J. TYLER POWELL,
    W. A. BARTLETT.